(12) United States Patent
Sarda

(10) Patent No.: US 9,195,528 B1
(45) Date of Patent: Nov. 24, 2015

(54) SYSTEMS AND METHODS FOR MANAGING FAILOVER CLUSTERS

(75) Inventor: Pooja Sarda, Cupertino, CA (US)

(73) Assignee: Symantec Corporation, Mountain View, CA (US)

( * ) Notice: Subject to any disclaimer, the term of this patent is extended or adjusted under 35 U.S.C. 154(b) by 1049 days.

(21) Appl. No.: 12/711,445

(22) Filed: Feb. 24, 2010

(51) Int. Cl.
G06F 11/00 (2006.01)

(52) U.S. Cl.
CPC .................................... *G06F 11/00* (2013.01)

(58) Field of Classification Search
CPC ....................................................... G06F 11/20
See application file for complete search history.

(56) References Cited

U.S. PATENT DOCUMENTS 7,451,347 B2 * 11/2008 Subbaraman et al. .......... 714/10

* cited by examiner

*Primary Examiner* — Amine Riad
(74) *Attorney, Agent, or Firm* — ALG Intellectual Property, LLC

(57) ABSTRACT

A computer-implemented method for managing failover clusters. The method may include maintaining a failover cluster comprising first and second cluster nodes, identifying a first instance of a service group on the first cluster node, and initiating failover of the first cluster node to the second cluster node. The method may also include bringing at least a portion of a second instance of the service group online before taking the first instance of the service group completely offline. Various other methods, systems, and computer-readable media are also disclosed.

14 Claims, 6 Drawing Sheets

SYSTEMS AND METHODS FOR MANAGING FAILOVER CLUSTERS

BACKGROUND

Business continuity and disaster recovery refers to the capability to restore normal (or near-normal) business operations, from a critical business application perspective, after the occurrence of a disaster that interrupts business operations. Business continuity and disaster recovery may require the ability to bring up mission-critical applications and the data these applications depend on and make them available to users as quickly as business requirements dictate. In cases where downtime is costly, the process may involve automation. For mission-critical applications that demand minimal downtime, the disaster recovery process may need to be highly automated and resilient. Clustering technologies may provide such highly automated and resilient disaster recovery.

Clusters may include multiple systems connected in various combinations to shared storage devices. Cluster server software may monitor and control applications running in the cluster and may restart applications in response to a variety of hardware or software faults. For failover service groups running in traditional clusters, the time to failover includes the time needed to offline all the resources of the service group from the failed node plus the time needed to online all the resources of the service group on the failover node. Unfortunately, waiting until a service group is completely offline to begin the processing of brining the service group back online may be inefficient and may result in failure to comply with a service level agreement. What is needed, therefore, is a more efficient mechanism for failing over service groups in cluster environments.

SUMMARY

As will be described in greater detail below, the instant disclosure generally relates to systems and methods for managing failover clusters. A computer-implemented method for managing failover clusters may include maintaining a failover cluster comprising first and second cluster nodes and identifying a first instance of a service group on the first cluster node. The method may also include initiating failover of the first cluster node to the second cluster node and bringing at least a portion of a second instance of the service group online before taking the first instance of the service group completely offline.

In some embodiments, identifying the first instance of the service group on the first cluster node may include at least one of detecting failure of a component of the first instance of the service group, detecting that the first instance of the service group is being brought offline, and/or determining that failure of a component of the first instance of the service group may be imminent. According to various embodiments, bringing at least a portion of the second instance of the service group online before taking the first instance of the service group completely offline may include bringing at least a portion of a service online on the second cluster node while taking at least a portion of a service offline on the first cluster node. In such embodiments, the portion of the service of the second cluster node may include a task that can be performed on the second cluster node before the first instance of the service group is brought completely offline.

Additionally or alternatively, the portion of the second instance of the service group that is brought online before the first instance of the service group is taken completely offline may include one or more tasks that are not dependent on resources in the service group. In some embodiments, the portion of the second instance of the service group that is brought online before the first instance of the service group is taken completely offline may include one or more resources that are not dependent on other resources in the service group.

The method may further include identifying a first set of tasks performed in bringing the service group online that do not depend on resources in the service group. In such embodiments, the first set of tasks may include the portion of the second instance of the service group that is brought online before taking the first instance of the service group offline. The method may also include identifying a second set of tasks performed in bringing the service group online that are dependent on one or more resources in the service group and performing the second set of tasks after the first instance of the service group is brought completely offline.

In certain embodiments, a system for managing failover clusters may include an identification module programmed to identify a first instance of a service group on a first cluster node of a failover cluster, an initiation module programmed to initiate failover of the first cluster node to a second cluster node of the failover cluster, and a failover module programmed to bring at least a portion of a second instance of the service group online before taking the first instance of the service group completely offline. The system may also include at least one processor configured to execute the identification module, the initiation module, and the failover module.

In some embodiments, the identification module may be programmed to identify the first instance of the service group on the first cluster node by performing at least one of: 1) detecting failure of a component of the first instance of the service group; 2) detecting that the first instance of the service group is being brought offline; and 3) determining that failure of a component of the first instance of the service group may be imminent.

According to various embodiments, the failover module may be programmed to bring at least a portion of the second instance of the service group online before taking the first instance of the service group completely offline by bringing at least a portion of a service online on the second cluster node while taking at least a portion of a service offline on the first cluster node. In certain embodiments, the portion of the service of the second cluster node may include a task that can be performed on the second cluster node before the first instance of the service group is brought completely offline. In such embodiments, the portion of the second instance of the service group that is brought online before the first instance of the service group is taken completely offline may include one or more tasks that are not dependent on resources in the service group.

Additionally or alternatively, the portion of the second instance of the service group that is brought online before the first instance of the service group is taken completely offline may include one or more resources that are not dependent on other resources in the service group. In some embodiments, the identification module is programmed to identify a first set of tasks performed in bringing the service group online that do not depend on resources in the service group. In such embodiments, the first set of tasks may include the portion of the second instance of the service group that is brought online before taking the first instance of the service group offline, the identification module may be programmed to identify a second set of tasks performed in bringing the service group online that are dependent on one or more resources in the service group, and the failover module may be programmed to perform the second set of tasks after the first instance of the service group is brought completely offline.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
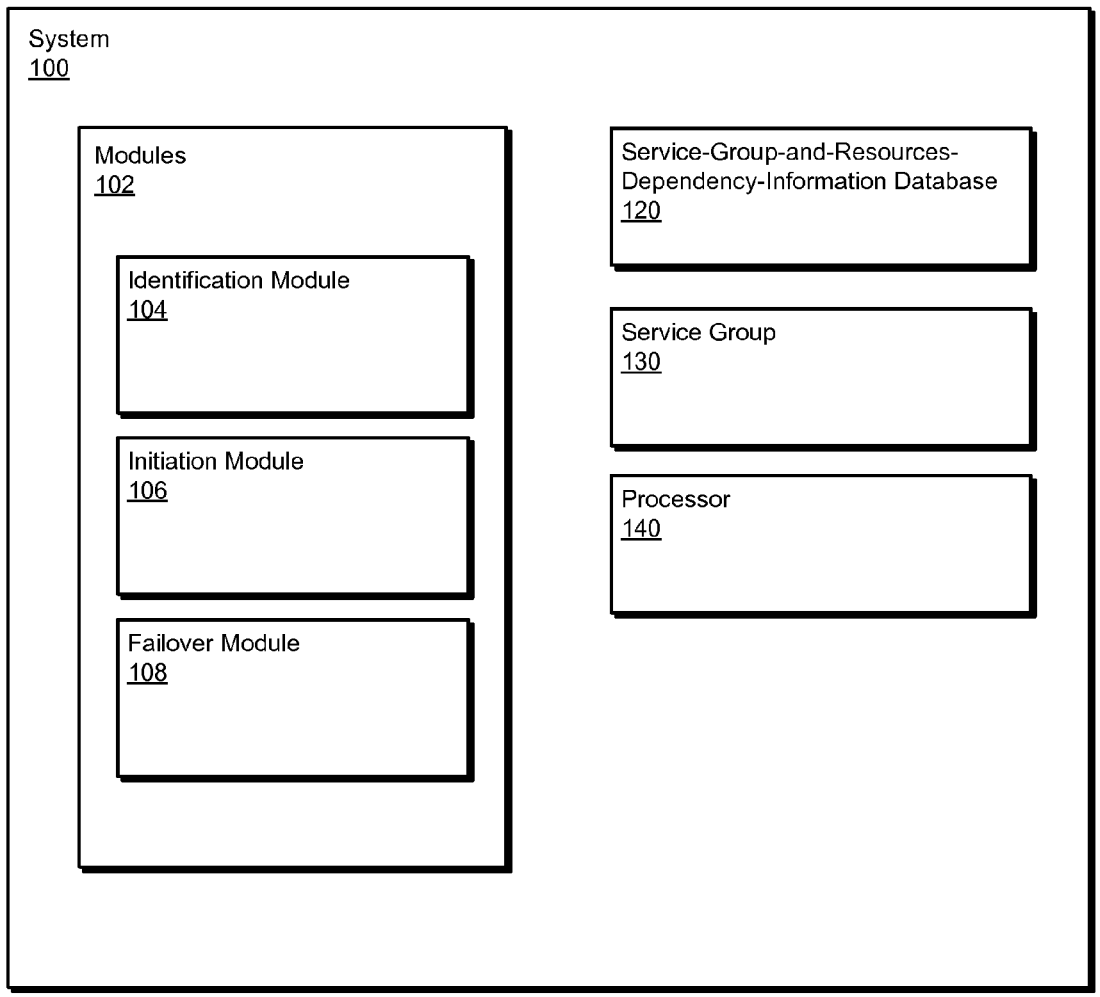
FIG. 1 is a block diagram of an exemplary system for managing failover clusters.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for managing failover clusters. Embodiments of the instant disclosure may reduce downtime in cluster environments by starting online tasks while still performing offline tasks. For example, a cluster server may overlap online tasks and offline tasks by beginning the process of bringing a service group online on a failover node before the service group is completely taken offline from a failed node.

Figure 2:
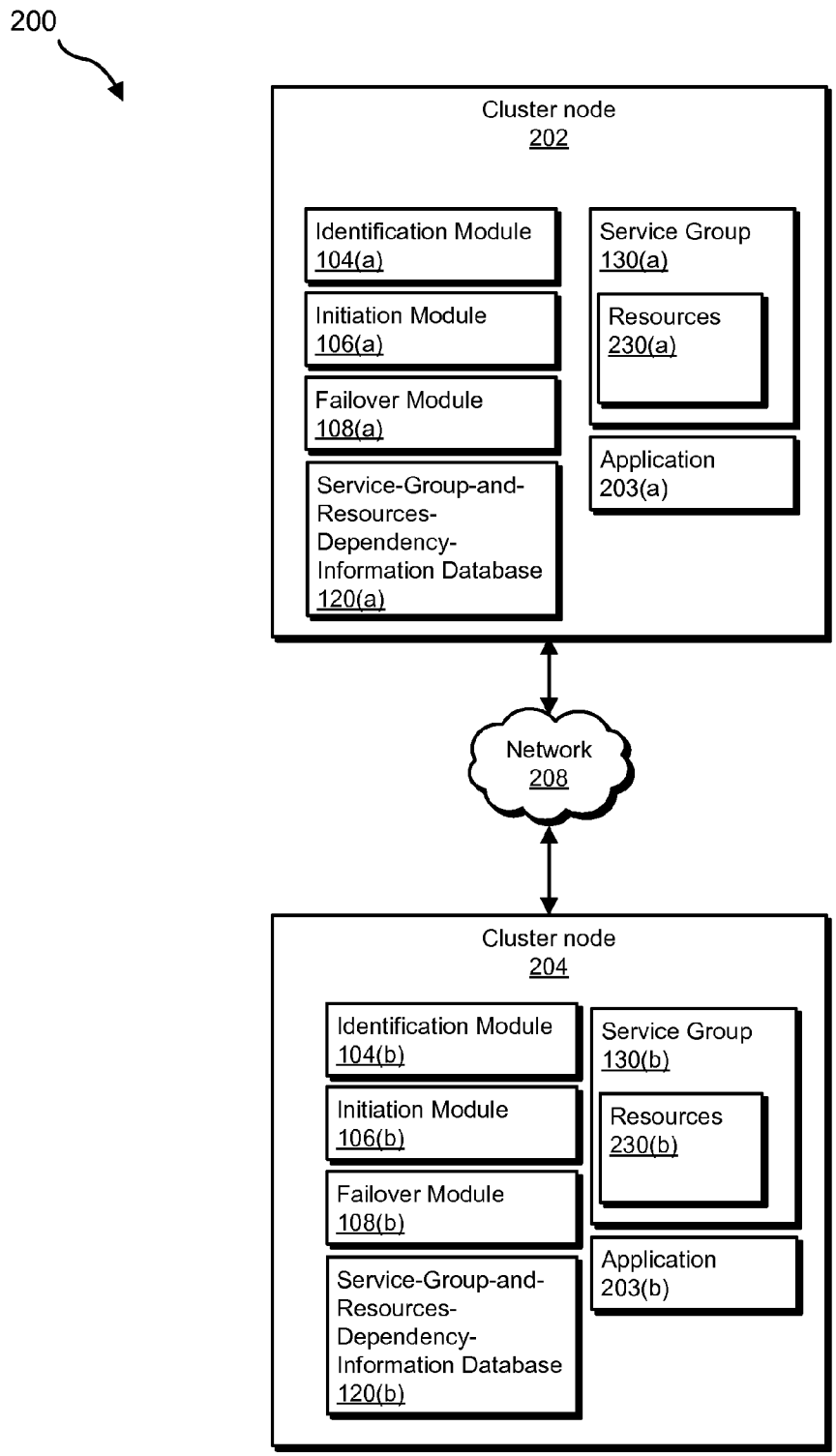
FIG. 2 is a block diagram of an exemplary system for managing failover clusters.

The following will provide, with reference to FIGS. 1-2, detailed descriptions of exemplary systems for managing failover clusters. Detailed descriptions of corresponding computer-implemented methods will also be provided in connection with FIG. 3, and descriptions of exemplary resource dependencies are provided in connection with FIG. 4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for managing failover clusters. As illustrated in this figure, exemplary system 100 may include one or more modules 102 for performing one or more tasks. For example, and as will be explained in greater detail below, exemplary system 100 may include an identification module 104 programmed to identify a first instance of a service group on a first cluster node. Exemplary system 100 may also include an initiation module 106 programmed to initiate failover of the first cluster node to a second cluster node.

In addition, and as will be described in greater detail below, exemplary system 100 may include a failover module 108 programmed to bring at least a portion of a second instance of the service group online before taking the first instance of the service group completely offline. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., cluster node 202 and/or cluster node 204), computing system 510 in FIG. 5, and/or portions of exemplary network architecture 600 in FIG. 6. One or more of modules 102 in FIG. 1 may also represent all or portions of one or more special-purpose computers configured to perform one or more tasks.

Failover module 108, initiation module 106, and/or identification module 104 may be part of a cluster monitor or other cluster server software for managing and maintaining cluster nodes. Examples of cluster server software include VERITAS CLUSTER SERVER, MICROSOFT CLUSTER SERVER, LINUX CLUSTER SERVER, and/or any other suitable type of cluster software. Cluster server software may provide failover clusters (i.e., high-availability clusters), which may be implemented for the purpose of improving availability of services and may operate having redundant nodes which are used to provide service when system components fail.

As illustrated in FIG. 1, exemplary system 100 may also include a service-group-and-resources-dependency-information database 120. Service-group-and-resources-dependency-information database 120 may store information identifying one or more resource dependencies of one or more service groups, as discussed in greater detail below. Service-group-and-resources-dependency-information database 120 may represent portions of a single database or computing device or a plurality of databases or computing devices. Service-group-and-resources-dependency-information database 120 may also represent a portion of one or more computing devices. For example, service-group-and-resources-dependency-information database 120 may represent a portion of cluster node 202 in FIG. 2, cluster node 204 in FIG. 2, computing system 510 in FIG. 5, and/or portions of exemplary network architecture 600 in FIG. 6. Alternatively, databases 120 in FIG. 1 may represent one or more physically separate devices capable of being accessed by a computing device, such as cluster node 202 in FIG. 2, cluster node 204 in FIG. 2, computing system 510 in FIG. 5, and/or portions of exemplary network architecture 600 in FIG. 6.

System 100 may include a service group 130. A service group may be a set of resources working together to provide application services to clients (e.g., cluster nodes). Service groups may include any suitable number and/or type of resource. As an example, a web application service group might include disk groups on which the web pages to be served are stored, a volume built in the disk group, a file system using the volume, a database whose table spaces are files and whose rows contain page pointers, a network interface card or cards used to export the web service, one or more IP addresses associated with the network card(s), and/or the application program and associated code libraries.

A cluster server may perform administrative operations on service group resources, including starting, stopping, restarting, and monitoring at the service group level. Service group operations may initiate administrative operations for all resources within the group. For example, when a service group is brought online, all the resources within the group may be brought online. When a failover occurs in the cluster server, resources do not typically fail-over individually—instead, the entire service group that the resource is a member of is the unit of failover. If there is more than one group defined on a server, one group may fail-over without affecting the other group(s) on the server.

If a service group is to run on a particular server, all of the resources the service group requires may need to be available to the server. The resources comprising a service group may have interdependencies. In other words, some resources (e.g., volumes) may need to be operational before other resources (e.g., a file system) can be made operational. Resource dependencies may determine the order specific resources within a service group are brought online or offline when the service group is brought offline or online. For example, a volume manager disk group may need to be imported before volumes in the disk group can be started, and volumes may need to start before file systems can be mounted. In the same manner, file systems may need to be unmounted before volumes are stopped, and volumes may need to be stopped before disk groups are deported.

As shown in FIG. 1, System 100 may also include a processor 140, which may be configured to execute identification module 104, initiation module 106, and/or failover module 108. Processor 140 generally represents any device capable of executing code, such as processor 514 in FIG. 5.

Exemplary system 100 in FIG. 1 may be deployed in a variety of ways. For example, all or a portion of exemplary system 100 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

As shown in FIG. 2, system 200 may include cluster nodes 202 and 204. Cluster nodes 202 and 204 generally represent any type or form of computing device capable of reading computer-executable instructions. As shown in FIG. 2, cluster node 202 may include an identification module 104(*a*), an initiation module 106(*a*), a failover module 108(*a*), a service-group-and-resources-dependency-information database 120(*a*), and an application 203(*a*). Cluster node 202 may also include a service group 130(*a*) having resources 230(*a*).

Similarly, cluster node 204 may include an identification module 104(*b*), an initiation module 106(*b*), a failover module 108(*b*), and a service-group-and-resources-dependency-information database 120(*b*), and an application 203(*b*). Cluster node 204 may also include a service group 130(*b*) having resources 230(*b*). As discussed in greater detail in FIG. 3, in the event of a failure on cluster node 202, service group 130(*a*) may be taken offline on cluster node 202 and brought online on cluster node 204.

Service groups 130(*a*) and 130(*b*) may be referred to as instances of service group 130. Instances of service groups may include the same sets of resources on different physical or virtual machines. For example, if service group 130 includes a disk group and a network interface adapter, resources 230(*a*) of service group 130(*a*) may include a disk group and a network interface adapter of cluster node 202 and resources 230(*b*) of service group 130(*b*) may include a disk group and a network interface adapter of cluster node 204.

In the example shown in FIG. 2, cluster nodes 202 and 204 may represent a cluster. As used herein, the term "cluster node" generally refers to any computing device and/or group of resources (i.e., service group) that is part of a cluster of linked computing devices. Examples of cluster nodes include, without limitation, laptops, desktops, servers, virtual machines, embedded systems, combinations of one or more of the same, cluster service groups, exemplary computing system 510 in FIG. 5, or any other suitable computing device or system. Clusters may also include more than two nodes and may be configured to provide high availability for applications (e.g., clusters may include redundant nodes that provide failover capabilities).

Cluster nodes 202 and 204 may include any suitable environment. For example, cluster node 202 and/or cluster node 204 may include a WINDOWS NT environment, a SOLARIS environment, an HP/UX environment, and/or any various other types of environments.

Cluster node 202 and cluster node 204 may communicate over network 208. Network 208 generally represents any medium or architecture capable of facilitating communication or data transfer. Examples of network 208 include, without limitation, an intranet, a Wide Area Network ("WAN"), a Local Area Network ("LAN"), a Personal Area Network ("PAN"), the Internet, Power Line Communications ("PLC"), a cellular network (e.g., a GSM Network), exemplary network architecture 600 in FIG. 6, or the like. Network 208 may facilitate communication or data transfer using wireless or wired connections. In some embodiments, network 208 may include a cluster volume accessed by cluster nodes 202 and 204.

In some embodiments, all or a portion of exemplary system 200 may be implemented in a virtual environment. For example, cluster nodes 202 and 204 may be implemented as virtual machines running as guest systems on two different host systems (i.e., physical machines with virtualization software). Such a configuration may provide high-availability while making possible live migrations of virtual cluster nodes between host systems. In a second example, cluster node 202 may run directly on a physical host system while cluster node 204 runs as a guest system on the same host system. As a third example, both cluster nodes 202 and 204 may run as guest systems on a single host system. The second and third examples may make efficient use of hardware but may also be less useful for providing high-availability.

Figure 3:
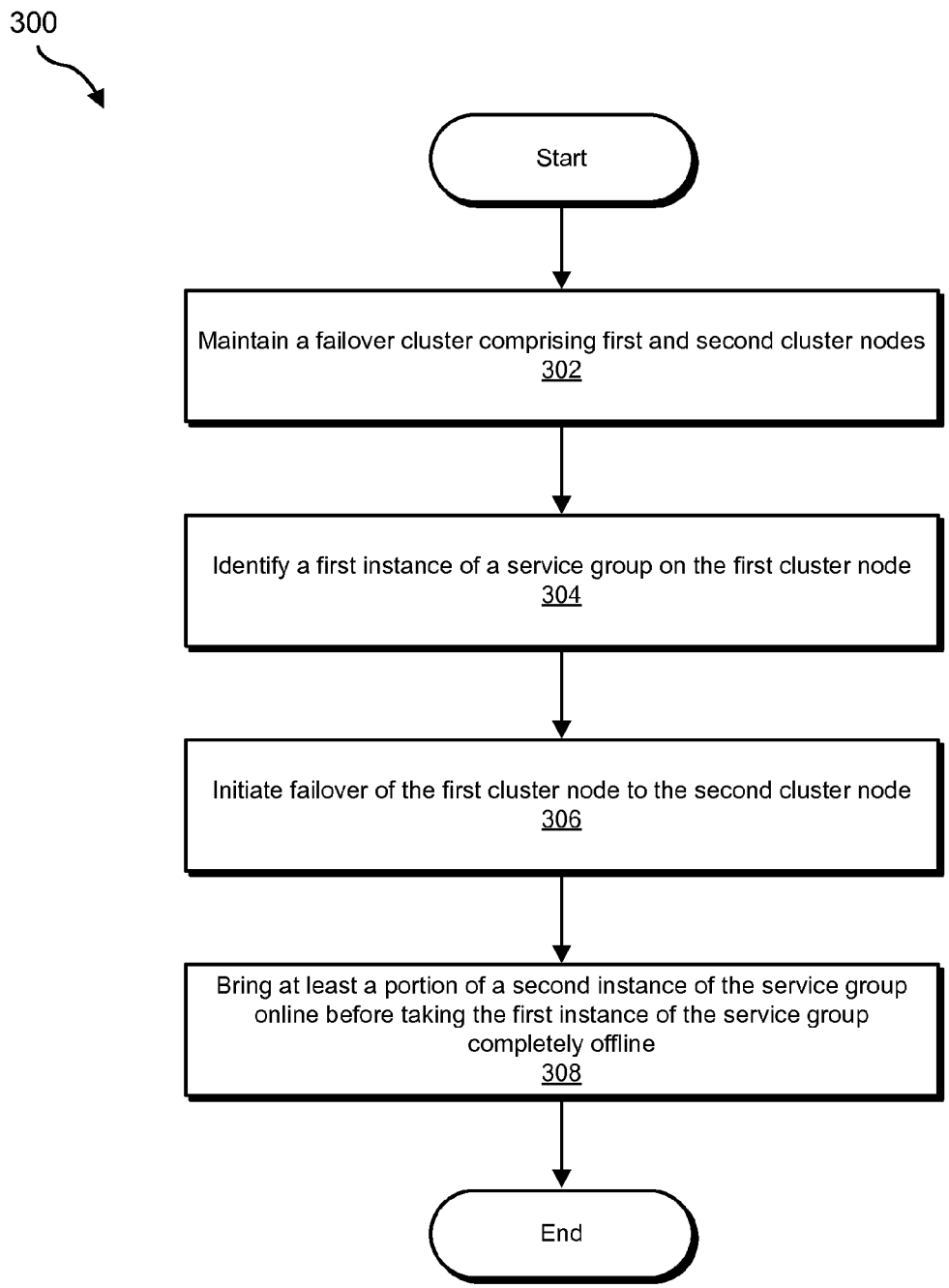
FIG. 3 is a flow diagram of an exemplary method for managing failover clusters.

FIG. 3 is a flow diagram of an exemplary computer-implemented method 300 for managing failover clusters. The steps in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

At step 302 in FIG. 3, one or more of the systems described herein may maintain a failover cluster comprising first and second cluster nodes. For example a cluster server, which may include identification module 104, initiation module 106, and failover module 108, may maintain cluster nodes 202 and 204. The cluster server may maintain cluster nodes 202 and 204 by providing one or more of a variety of cluster services. For example, the cluster server may manage communications between cluster nodes, detect failure on a cluster node, and/or facilitate failover to another cluster node in the event of a failure.

At step 304 in FIG. 3, one or more of the systems described herein may identify a first instance of a service group on the first cluster node. For example, identification module 104(b) may identify service group 130(a) when service group 130(a) fails and cluster node 204 is designated as the failover cluster node. A failed service group may be a service group that includes a resource that is no longer functioning properly due to a hardware problem, a software problem, being overloaded, and/or any other issue.

In some embodiments, identification module 104(a) may identify service group 130(a) on cluster node 202. Identification module 104(a) may identify service group 130(a) in a variety of contexts. For example, identification module 104(a) may identify service group 130(a) when a trigger that begins a failover process is identified. Such a trigger may include detecting failure of a component of service group 130(a), detecting that the service group 130(a) is being brought off-line, and/or determining that failure of a resource of service group 130(a) may be imminent. Failure of a resource of service group 130(a) may be imminent if it is determined that a resource of service group 130(a) is in a degraded state, if there is high system load on cluster node 202, and/or if any other condition of a resource of service group 130(a) suggests imminent failover of service group 130(a).

At step 306 in FIG. 3, one or more of the systems described herein may initiate failover of the first cluster node to the second cluster node. For example, initiation module 106(a) and/or initiation module 106(b) may initiate failover of cluster node 202 to cluster node 204. Failover may be initiated in a variety of contexts. In some embodiments, initiation module 106(a) and/or 106(b) may initiate failover of the first cluster node by beginning the process of bringing resources of service group 130(b) online and/or bringing resources of service group 130(a) off-line.

Initiation module 106(a), initiation module 106(b), and/or other components of system 200 may mange failover situations in a variety of ways. For example, initiation modules 106(a) and 106(b) may communicate their status to each other with a heartbeat. A heartbeat sent from cluster node 202 to cluster node 204 may inform cluster node 204 of actions taking place and the status of all resources on cluster node 202. This cluster communication may take place over a private, dedicated network between cluster nodes. Cluster nodes 202 and 204 may use a communication package that include Low Latency Transport ("LLT") and/or Group membership/Atomic Broadcast ("GAB"). These packages may function together as a replacement for the IP stack and may provide a robust, high-speed communication link between systems without the latency induced by the normal network stack.

Embodiments of the instant disclosure may manage service group failovers for various cluster configurations. For example, a node in a multi-node cluster may run ten service groups. In this example, if a failure occurs in one service group, all service groups on the cluster node may be moved to an empty, redundant cluster node. If such a node is not available, the service groups may be spread out across remaining cluster nodes.

A cluster server may use any suitable algorithm or heuristic to determine which cluster node will act as a takeover node after a failure. Examples of cluster-selection algorithms may include priority algorithms, round-robin algorithms, and/or load algorithms. Priority is typically the most basic node-selection algorithm. In priority algorithms, the order of nodes listed in a configuration set may be used to select a failover node. For example, the first node in a system list that is in a running state may be selected. Priority-based failover may be useful in relatively small cluster environments. Round-robin algorithms may select a cluster node running the least number of service groups as a failover target. This approach may be useful for larger clusters running a large number of service groups of essentially the same server load characteristics (for example, similar databases or applications).

Load-based selection algorithms may provide additional flexibility. Load-based algorithms may use system limits and/or group prerequisites to select failover nodes. System limits may set a fixed capacity to cluster nodes and a fixed demand for service groups. For example, a first cluster node may be set to a capacity of 400 and a second cluster node may have a capacity of 200. A service group may have a determined load of 150. On failure of the service group, the cluster node in the cluster with the highest remaining capacity may be chosen to failover the service group. In this example, the first cluster node may be chosen to online the service group. When the service group is onlined on the first cluster node, the 150 load may be subtracted from the cluster node's remaining capacity. The cluster server may re-evaluate the remaining capacity of all cluster nodes and may choose the best candidate to handle a subsequent failure.

At step 308 in FIG. 3, one or more of the systems described herein may bring at least a portion of a second instance of the service group online before taking the first instance of the service group completely off-line. For example, failover module 108(b) may bring at least a portion of service group 130(b) online before service group 130(a) is taken completely off-line.

Step 308 may be performed in a variety of ways. For example, failover module 108(b) may bring at least a portion of a service online on the second cluster node while taking at least a portion of a service off-line on the first cluster node. In some embodiments, the portion of the service of the second cluster node may include a task that can be performed on the second cluster node before the first instance of the service group is brought completely off-line. Additionally or alternatively, the portion of the second instance of the service group that is brought online before the first instance of the service group is taken completely off-line may include one or more resources or that are not dependent on other resources in the service group.

Failover module 108(b) may access service-group-and-resources-dependency-information database 120(a) to identify resource dependencies of service group 130(a). As previously stated, service group dependencies define relationships between resources that require one resource to be online or offline before another resource is onlined or offlined. For example, an application group accessing a database group may need to wait to start until the database is started.

In some embodiments, service group dependencies may be categorized in various different categories. In one example, a cluster server may provide three possible online groups and one offline group: online local, online global, online remote, and offline local. In an online group dependency, the parent (upper) group may need to wait for the child (lower) group to be brought online before it can start. For example, to configure an application and a database service as two separate groups, a system administrator may specify the application as the parent and the database service as the child. If the child faults, the parent is stopped and restarted after the child restarts.

As noted, an online group dependency may take one of three forms. In an online local dependency, an instance of the parent group depends on an instance of the child group being online on the same system. This type of dependency is typically used in a database and application service configuration where the application directly connects to the database. In an online global dependency, an instance of the parent group may depend on an instance of the child group being online on any system. This type of dependency typically is used in a database environment with a front-end Web server connecting via IP. In an online remote dependency, an instance of a parent group depends on an instance of the child group being online on any system other than the system on which the parent is online. This configuration may be useful where the load of the combined resource groups is too great for a single system.

In an offline local group dependency, the parent group may be started only if the child group is offline on the system and vice versa. This prevents conflicting applications from running on the same system. For example, an administrator may configure a production application on one system and a test application on another. If the production application fails, the test application will be put offline before the production application starts.

Failover module 108 may evaluate resource dependencies in service group 130 and may select resources (or tasks for brining resources online) that are not dependent on other resources for a pre-onlining process (i.e., a process for bringing resources online before offlining is complete). In some embodiments, failover module 108 may select resources that do not have any children for a pre-onlining process.

As an example, to fail cluster node 202 over to cluster node 204, failover module 108(b) may identify a first set of tasks and/or resources for bringing the service group online that do not depend on resources or tasks in the service group (i.e., tasks or resources that do not have online local dependencies, online global dependencies, online remote dependencies, offline local dependencies, and/or any other dependencies). In such embodiments, the first set of tasks and/or resources may include the portion of the second instance of the service group that is brought online before taking the first instance of the service group off-line. Failover module 108(a) may wait to start tasks and/or online resources that are dependent on one or more resources in the service group until the first instance of the service group is brought completely off-line (i.e., all resources of the first instance of the service group are offlined).

Figure 4:
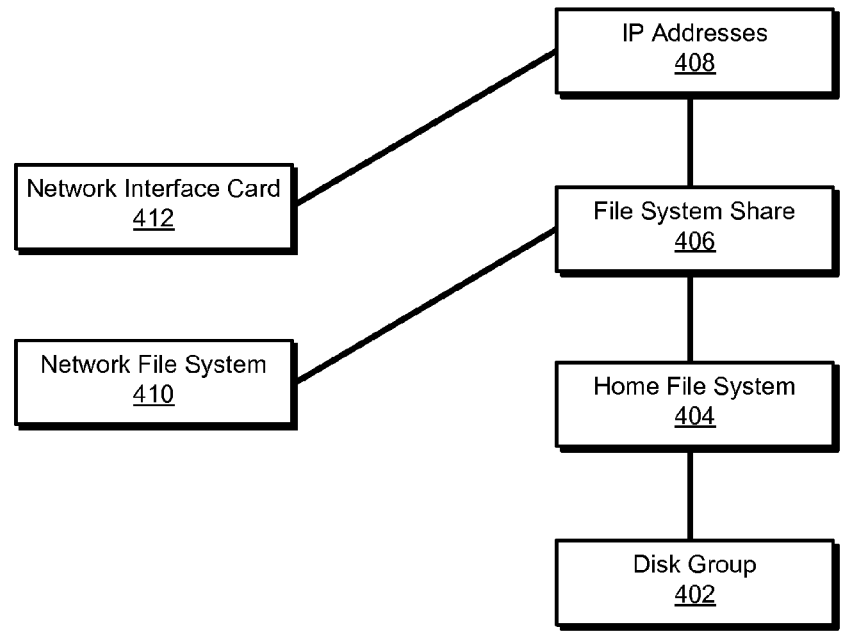
FIG. 4 is a block diagram of exemplary dependency relationships between resources of a service group.

FIG. 4 shows an example of resource dependencies 400, and the following discussion provides an example of how systems described herein may manage failover given the dependencies shown in FIG. 4. In this example, service group 130 may be an NFS Group that is being failed over from cluster node 202 to cluster node 204.

FIG. 4 shows resources that may be included in service groups 130(a) and 130(b). These resources include a disk group 402, a home file system 404, a file system share 406, a network file system 410, a network interface card 412, and IP addresses 408 (e.g., IP on all systems configured to run the service group). In a traditional cluster server solution, the cluster server may typically offline all of resources 402-412 from cluster node 202 before onlining resources 402-412 on cluster node 204.

In contrast, in embodiments of the instant disclosure, failover modules 108(a) and/or 108(b) may access service-group-and-resources-dependency-information databases 120(a) and/or 120(b) to identify a set of service group resources that are not dependent on other resources. This set of resources may then be brought online on cluster node 204 before corresponding resources are taken offline on cluster node 202.

In this example, home file system 404 may require disk group 402 to be online before mounting. File system share 406 of home file system 404 may require home file system 404 to be mounted as well as the network file system daemons of network file system 410 to be running. IP addresses 408 may require file system share 406 to be onlined and network interface card 412 to be up. Thus, IP addresses 408, file system share 406, and home file system 404 all depend on other resources, while disk group 402, network interface card 412, and network file system 410 do not depend on other resources.

Since disk group 402, network interface card 412, and network file system 410 do not depend on other resources, failover module 108(b) may begin bringing these resources online before the resources of service group 130(a) are taken completely offline. In this manner, embodiments of the instant disclosure may reduce recovery time in cluster failover situations.

Figure 5:
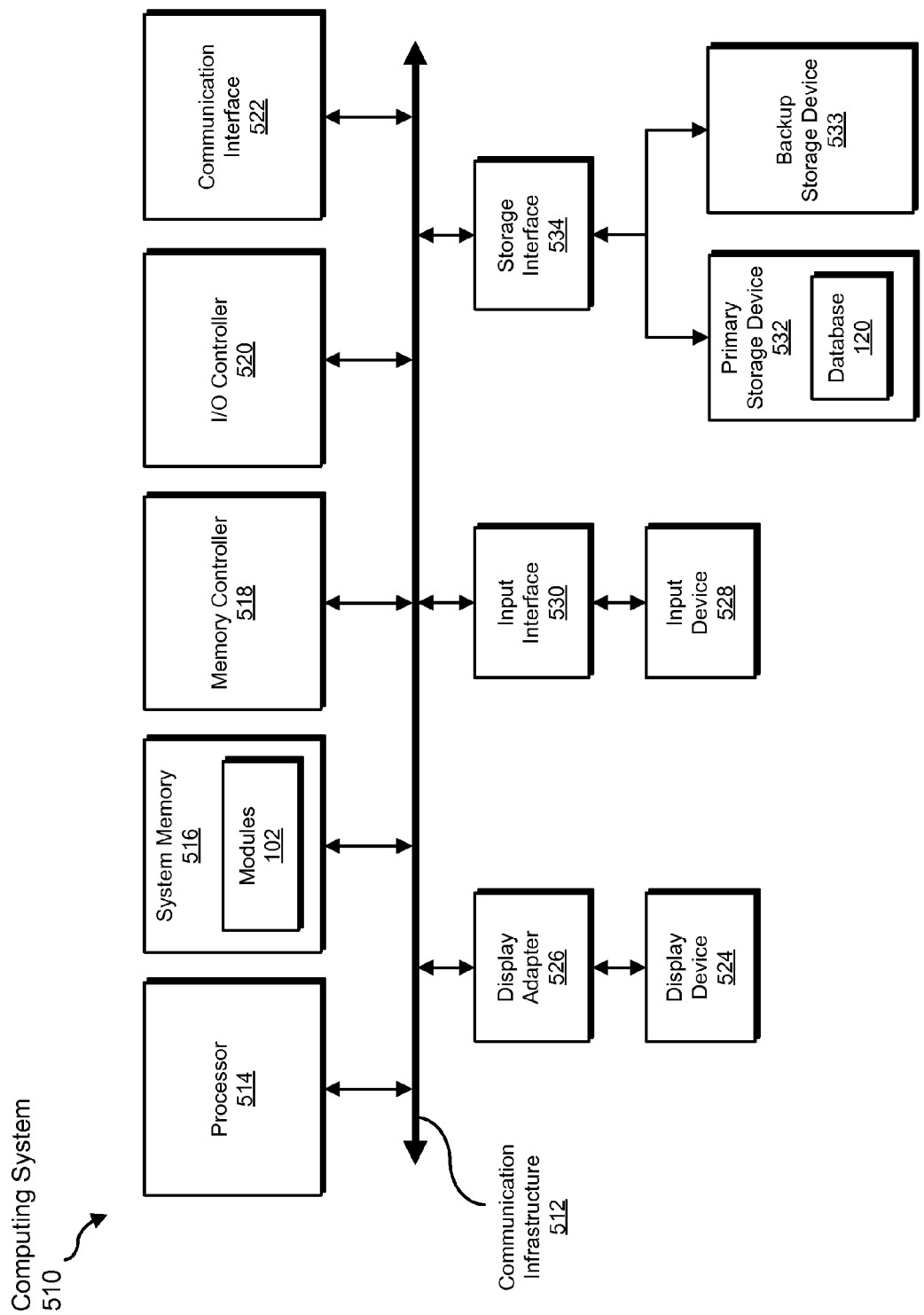
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the maintaining, identifying, initiating, bringing, detecting, determining, taking, and/or performing steps described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller may perform and/or be a means for performing, either alone or in combination with other elements, one or more of the steps or features described and/or illustrated herein, such as maintaining, identifying, initiating, bringing, detecting, determining, taking, and/or performing.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for performing, either alone or in combination with other elements, one or more of the maintaining, identifying, initiating, bringing, detecting, determining, taking, and/or performing steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the maintaining, identifying, initiating, bringing, detecting, determining, taking, and/or performing steps disclosed herein. Communication interface 522 may also be used to perform and/or be a means for performing other steps and features set forth in the instant disclosure.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the maintaining, identifying, initiating, bringing, detecting, determining, taking, and/or performing steps disclosed herein. Input device 528 may also be used to perform and/or be a means for performing other steps and features set forth in the instant disclosure.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

In certain embodiments, storage devices 532 and 533 may be used, for example, to perform and/or be a means for performing, either alone or in combination with other elements, one or more of the maintaining, identifying, initiating, bringing, detecting, determining, taking, and/or performing steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
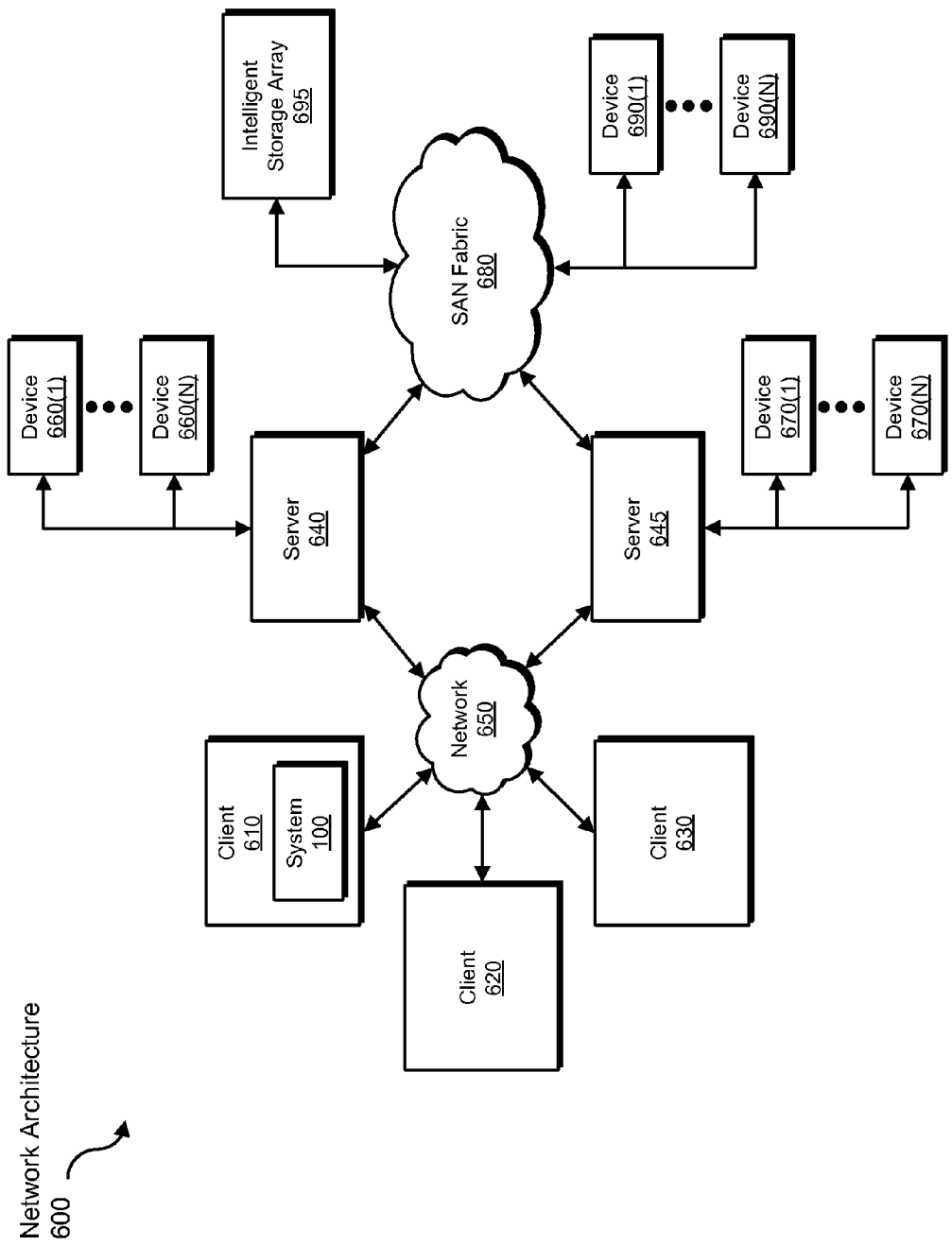
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 5. In one example, client system 610 may include system 100 from FIG. 1.

Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690 (1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650. Accordingly, network architecture 600 may perform and/or be a means for performing, either alone or in combination with other elements, one or more of the maintaining, identifying, initiating, bringing, detecting, determining, taking, and/or performing steps disclosed herein. Network architecture 600 may also be used to perform and/or be a means for performing other steps and features set forth in the instant disclosure.

As detailed above, computing system 510 and/or one or more components of network architecture 600 may perform and/or be a means for performing, either alone or in combination with other elements, one or more steps of an exemplary method for managing failover clusters.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules described herein may transform a failover cluster node by bringing one or more resources online on the cluster node.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for managing failover clusters, at least a portion of the method being performed by a computing device comprising at least one processor, the method comprising:
   maintaining a failover cluster comprising first and second cluster nodes;
   identifying a first instance of a service group on the first cluster node;
   initiating failover of the first cluster node to the second cluster node;
   bringing at least a portion of a second instance of the service group online before taking the first instance of the service group completely offline at least in part by bringing at least a portion of a service online on the second cluster node while taking at least a portion of a service offline on the first cluster node, the portion of the service of the second cluster node comprising a task that can be performed on the second cluster node before the first instance of the service group is brought completely offline.

2. The method of claim 1, wherein identifying the first instance of the service group on the first cluster node comprises at least one of:
   detecting failure of a component of the first instance of the service group;
   detecting that the first instance of the service group is being brought offline;
   determining that failure of a component of the first instance of the service group may be imminent.

3. The method of claim 1, wherein:
   the portion of the second instance of the service group that is brought online before the first instance of the service group is taken completely offline comprises one or more tasks that are not dependent on resources in the service group.

4. The method of claim 1, wherein:
   the portion of the second instance of the service group that is brought online before the first instance of the service group is taken completely offline comprises one or more resources that are not dependent on other resources in the service group.

5. The method of claim 1, further comprising:
   identifying a first set of tasks performed in bringing the service group online that do not depend on resources in the service group, wherein the first set of tasks comprises the portion of the second instance of the service group that is brought online before taking the first instance of the service group offline;
   identifying a second set of tasks performed in bringing the service group online that are dependent on one or more resources in the service group;
   performing the second set of tasks after the first instance of the service group is brought completely offline.

6. A system for managing failover clusters, the system comprising:
   an identification module programmed to identify a first instance of a service group on a first cluster node of a failover cluster;
   an initiation module programmed to initiate failover of the first cluster node to a second cluster node of the failover cluster;
   a failover module programmed to bring at least a portion of a second instance of the service group online before taking the first instance of the service group completely offline at least in part by bringing at least a portion of a service online on the second cluster node while taking at least a portion of a service offline on the first cluster node, the portion of the service of the second cluster node comprising a task that can be performed on the second cluster node before the first instance of the service group is brought completely offline;
   at least one processor configured to execute the identification module, the initiation module, and the failover module.

7. The system of claim 6, wherein the identification module is programmed to identify the first instance of the service group on the first cluster node by performing at least one of:
   detecting failure of a component of the first instance of the service group;
   detecting that the first instance of the service group is being brought offline;
   determining that failure of a component of the first instance of the service group may be imminent.

8. The system of claim 6, wherein:
   the portion of the second instance of the service group that is brought online before the first instance of the service group is taken completely offline comprises one or more tasks that are not dependent on resources in the service group.

9. The system of claim 6, wherein:
   the portion of the second instance of the service group that is brought online before the first instance of the service group is taken completely offline comprises one or more resources that are not dependent on other resources in the service group.

10. The system of claim 6, wherein:
the identification module is programmed to identify a first set of tasks performed in bringing the service group online that do not depend on resources in the service group;
the first set of tasks comprises the portion of the second instance of the service group that is brought online before taking the first instance of the service group offline;
the identification module is programmed to identify a second set of tasks performed in bringing the service group online that are dependent on one or more resources in the service group;
the failover module is programmed to perform the second set of tasks after the first instance of the service group is brought completely offline.

11. A non-transitory computer-readable-storage medium comprising one or more computer-executable instructions that, when executed by at least one processor of a computing device, cause the computing device to:
maintain a failover cluster comprising first and second cluster nodes;
identify a first instance of a service group on the first cluster node;
initiate failover of the first cluster node to the second cluster node;
bring at least a portion of a second instance of the service group online before taking the first instance of the service group completely offline at least in part by bringing at least a portion of a service online on the second cluster node while taking at least a portion of a service offline on the first cluster node, the portion of the service of the second cluster node comprising a task that can be performed on the second cluster node before the first instance of the service group is brought completely offline.

12. The non-transitory computer-readable-storage medium of claim 11, wherein the one or more computer-executable instructions are programmed to cause the computing device to identify the first instance of the service group on the first cluster node by:
detecting failure of a component of the first instance of the service group;
detecting that the first instance of the service group is being brought offline;
determining that failure of a component of the first instance of the service group may be imminent.

13. The non-transitory computer-readable-storage medium of claim 11, wherein:
the portion of the second instance of the service group that is brought online before the first instance of the service group is taken completely offline comprises one or more tasks that are not dependent on resources in the service group.

14. The non-transitory computer-readable-storage medium of claim 11, wherein:
the portion of the second instance of the service group that is brought online before the first instance of the service group is taken completely offline comprises one or more resources that are not dependent on other resources in the service group.

* * * * *